(12) United States Patent
Yue et al.

(10) Patent No.: US 7,679,894 B2
(45) Date of Patent: Mar. 16, 2010

(54) MOUNTING APPARATUS FOR LCD PANEL

(75) Inventors: Yong Yue, Shenzhen (CN); Lin-Yun Hong, Shenzhen (CN); Hsuan-Chen Chen, Taipei Hsien (TW); Chien-Li Tsai, Taipei Hsien (TW)

(73) Assignees: Hong Fu Jin Precision Industry (ShenZhen) Co., Ltd., Shenzhen, Guangdong Province (CN); Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 523 days.

(21) Appl. No.: 11/557,106

(22) Filed: Nov. 7, 2006

(65) Prior Publication Data

US 2007/0253150 A1    Nov. 1, 2007

(30) Foreign Application Priority Data

Apr. 28, 2006    (CN)    ............. 2006 2 0013814 U

(51) Int. Cl.
*G06F 1/16*    (2006.01)
(52) U.S. Cl. ................................. 361/679.26
(58) Field of Classification Search ............ 361/681, 361/679.26, 679.27, 679.29
See application file for complete search history.

(56) References Cited

U.S. PATENT DOCUMENTS

| | | | |
|---|---|---|---|
| 5,422,751 A | 6/1995 | Lewis et al. | |
| 5,872,606 A * | 2/1999 | Kim | 349/58 |
| 6,272,006 B1 * | 8/2001 | Lee | 361/679.27 |
| 6,421,231 B1 * | 7/2002 | Jung | 361/679.27 |
| 6,525,790 B1 * | 2/2003 | Kan-o | 349/58 |
| 6,774,959 B2 * | 8/2004 | Agata et al. | 349/58 |
| 6,838,810 B1 * | 1/2005 | Bovio et al. | 313/422 |
| 6,859,357 B2 * | 2/2005 | Morimoto et al. | 361/679.55 |
| 7,307,833 B2 * | 12/2007 | Bang | 361/679.27 |
| 2007/0030636 A1 * | 2/2007 | Kim | 361/683 |

* cited by examiner

*Primary Examiner*—Lisa Lea-Edmonds
(74) *Attorney, Agent, or Firm*—Wei Te Chung

(57) ABSTRACT

A mounting apparatus includes a bezel, a first fixing bracket mounted to the bezel for fixing a side of an LCD panel, a second fixing bracket mounted to the bezel, a pair of sliding members slidable with respect to the second fixing bracket for fixing an opposite side of the LCD panel, and a cover mounted to the bezel for enclosing the LCD panel.

4 Claims, 5 Drawing Sheets

MOUNTING APPARATUS FOR LCD PANEL

CROSS-REFERENCES TO RELATED APPLICATION

This application is related to a copending application Ser. No. 11/557,108 entitled with "LIQUID CRYSTAL DISPLAY DEVICE", filed at Nov. 7, 2006, and assigned to the same assignee.

BACKGROUND OF THE INVENTION

1. Field of the Invention

The present invention relates to mounting apparatuses for mounting liquid crystal display (LCD) panels thereon, and particularly to a mounting apparatus which can be adjusted to mount different size LCD panels thereon.

2. Description of Related Art

Generally, in a portable computer, including but not limited to devices such as a notebook type personal computers, PDA apparatus and the like, a lid containing an LCD, which serves as a display unit to display a picture, is pivotably connected to a back end of a body. In the conventional portable computer, the lid with a certain width holds an LCD panel with a fixed corresponding width. However, the width of the LCD panel may be slightly different due to imperfections in the manufacturing process. When an LCD panel with a width slightly different to the fixed width is mounted to the lid, the fit may be forced possibly damaging the LCD panel.

What is needed, therefore, is a mounting apparatus which can adjustably receive different size LCD panels mounted thereon.

SUMMARY OF THE INVENTION

A mounting apparatus for liquid crystal display (LCD) panels is provided. In a preferred embodiment, the mounting apparatus includes a bezel, a first fixing bracket mounted to the bezel for fixing a side of an LCD panel, a second fixing bracket mounted to the bezel, at least one sliding member slidable with respect to the second fixing bracket for fixing an opposite side of the LCD panel before being secured to the bezel, and a cover mounted to the bezel for enclosing the LCD panel therebetween.

Other objects, advantages and novel features of the present invention will become more apparent from the following detailed description of preferred embodiments when taken in conjunction with the accompanying drawings, in which:

DETAILED DESCRIPTION OF THE INVENTION

Figure 1:
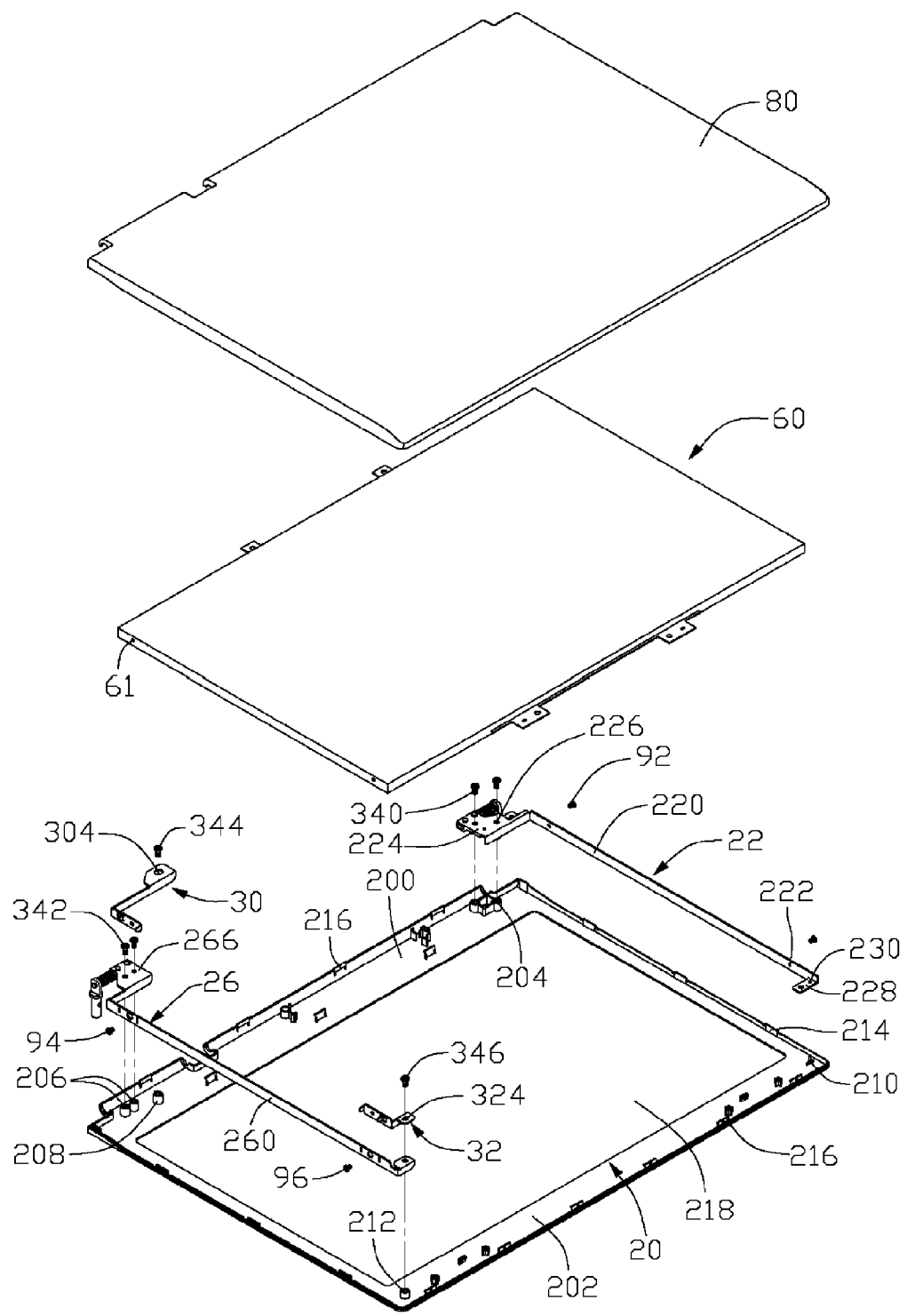
FIG. 1 is an exploded, isometric view of a mounting apparatus including a cover, in accordance with a preferred embodiment of the present invention, together with an LCD panel.

Referring to FIG. 1, a mounting apparatus in accordance with a preferred embodiment of the present invention which can adjustably mount different size LCD panels thereon is shown. In this embodiment, the LCD panel is used for displaying alphanumeric or graphic computer data. The mounting apparatus includes a bezel 20, a cover 80, a first fixing bracket 22, a second fixing bracket 26, a first sliding member 30, and a second sliding member 32. The first sliding member 30 and the second sliding member 32 are positioned at opposite ends of the second fixing bracket 26.

Figure 2:
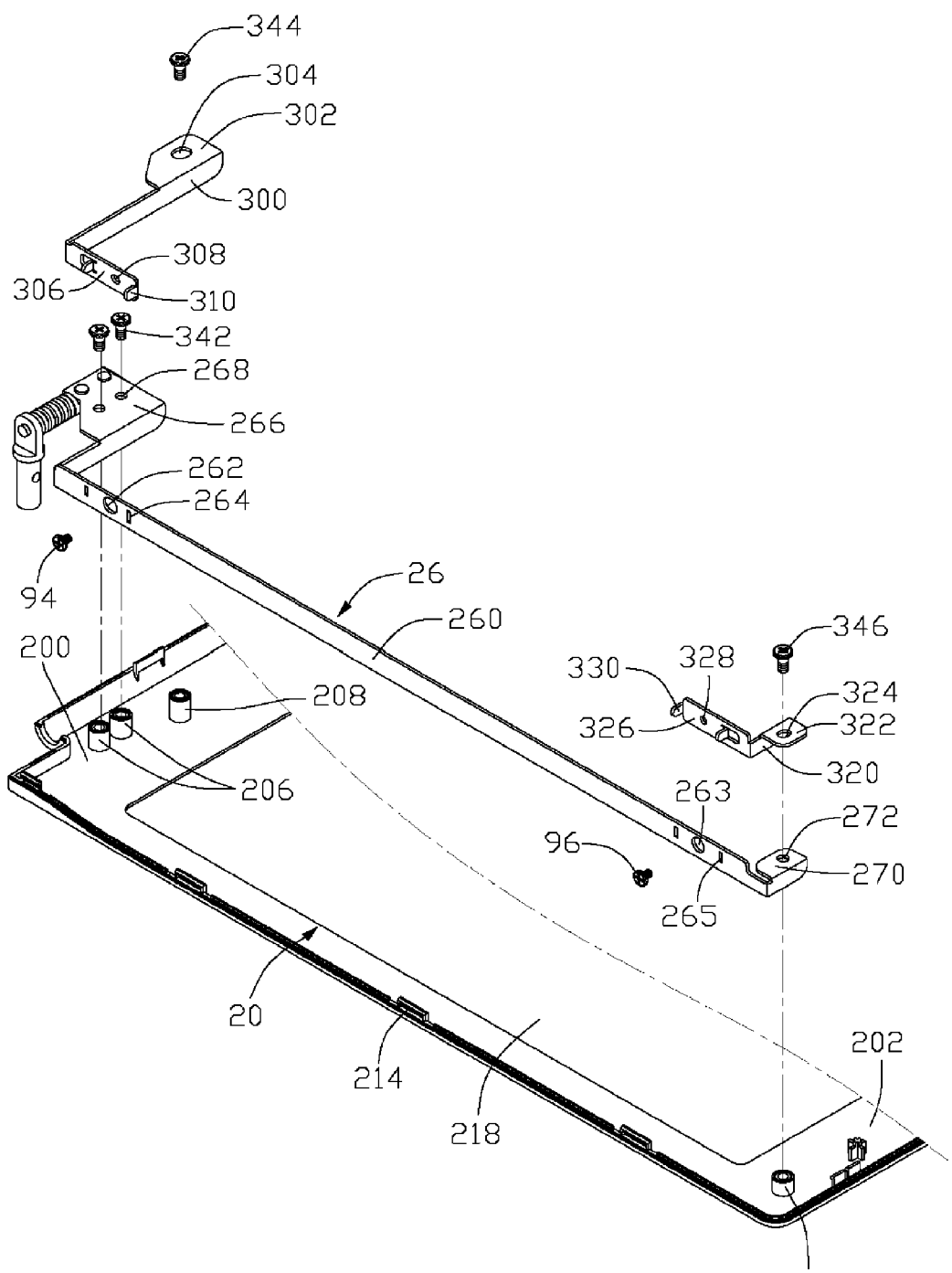
FIG. 2 is an enlarged view of a portion of FIG. 1.

Referring also to FIG. 2, the bezel 20 includes two opposite sides 200, 202. A pair of fixing posts 204 each defining a screw hole (not labeled) extends up from the bezel 20 at an end of the side 200. A pair of fixing posts 206 and a holding post 208 each defining a screw hole extend up from the bezel 20 at an opposite end of the side 200. The side 202 includes a guiding pin 210 and a holding post 212 formed at opposite ends thereof, respectively. A plurality of locking portions 214 and hooks 216 are formed at a periphery of the bezel 20. The bezel 20 defines an opening 218 therein.

The first fixing bracket 22 includes a body 220 defining a pair of apertures 222, a fixing plate 224 perpendicularly extending from an end edge of the body 220, and a flange 228 perpendicularly extending from a side edge of the body 220. The fixing plate 224 defines a pair of fixing holes 226 corresponding to the fixing posts 204. The flange 228 defines a guiding hole 230 corresponding to the guiding pin 210.

The second fixing bracket 26 includes a body 260. The body 260 defines a through hole 262 and a pair of slots 264 adjacent an end edge thereof, and a through hole 263 and a pair of slots 265 adjacent an opposite end edge thereof. A fixing plate 266 defining a pair of fixing holes 268 perpendicularly extends from the end edge of the body 260. A flange 270 defining a locking hole 272 perpendicularly extends from the opposite end edge of the body 260.

The first sliding member 30 includes a body 300, a fixing plate 302 perpendicularly extending from an upper right side edge of the body 300, and a limb 306 perpendicularly extending from a left end edge of the body 300. The fixing plate 302 defines an elongated slot 304 therein, corresponding to the holding post 208. The limb 306 defines an aperture 308 corresponding to the through hole 262. A pair of tabs 310 perpendicularly extends from the limb 306 corresponding to the slots 264.

The second sliding member 32 includes a body 320, a fixing plate 322 perpendicularly extending from an upper right side edge of the body 320, and a limb 326 perpendicularly extending from a left end edge of the body 320. The fixing plate 322 defines an elongated slot 324 therein, corresponding to the locking hole 272. The limb 326 defines an aperture 328 corresponding to the through hole 263. A pair of tabs 330 perpendicularly extends from the limb 326 corresponding to the slots 265.

Figure 3:
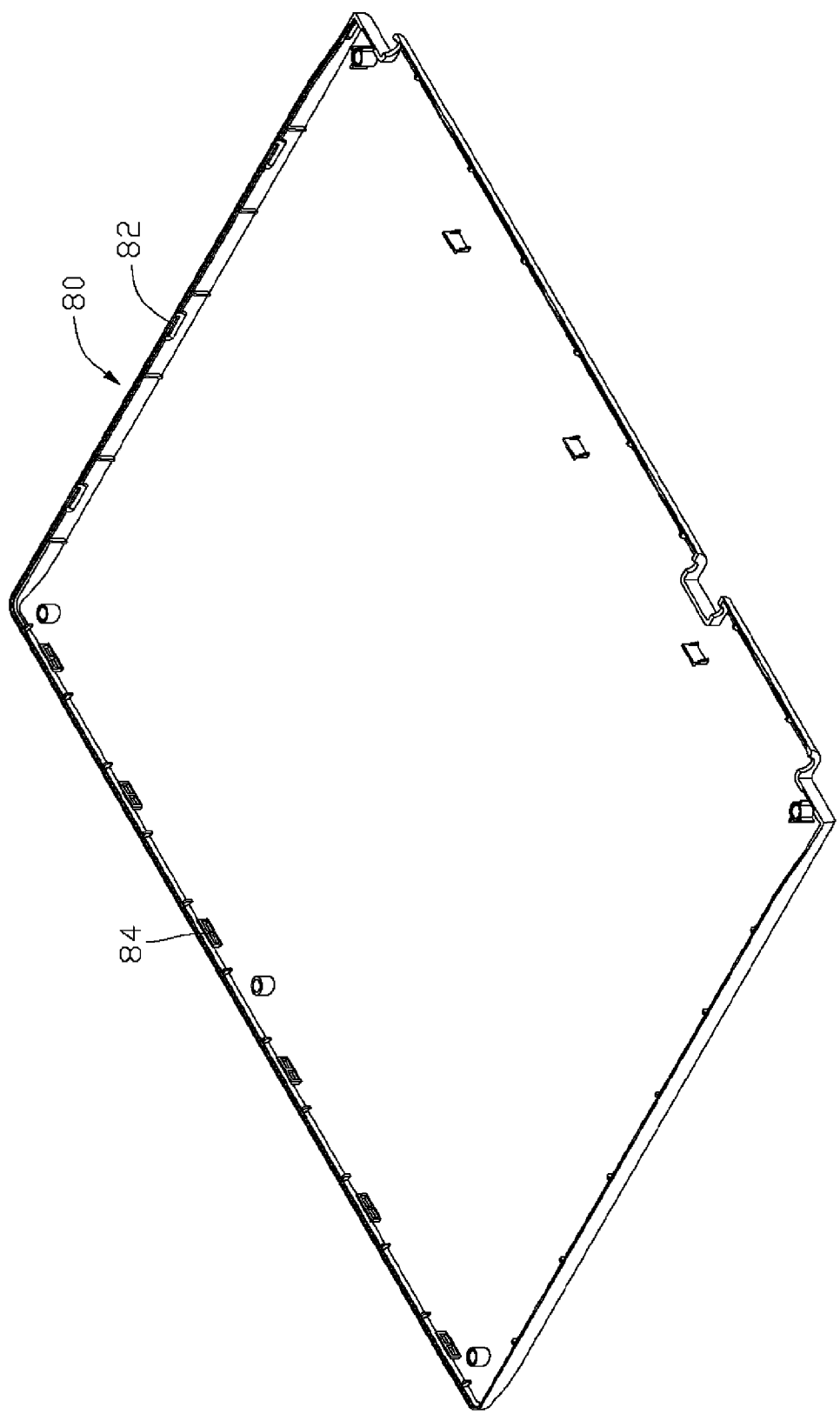
FIG. 3 is an isometric view of the cover of FIG. 1, but viewed from another aspect.

An LCD panel 60 for being mounted to the LCD panel mounting apparatus defines a pair of screw holes 61 in each of two opposite sides thereof. Referring also to FIG. 3, the cover 80 includes a plurality of hooks 82 corresponding to the locking portions 214 of the bezel 20, and a plurality of locking portions 84 corresponding to the hooks 216 of the bezel 20.

Figure 4:
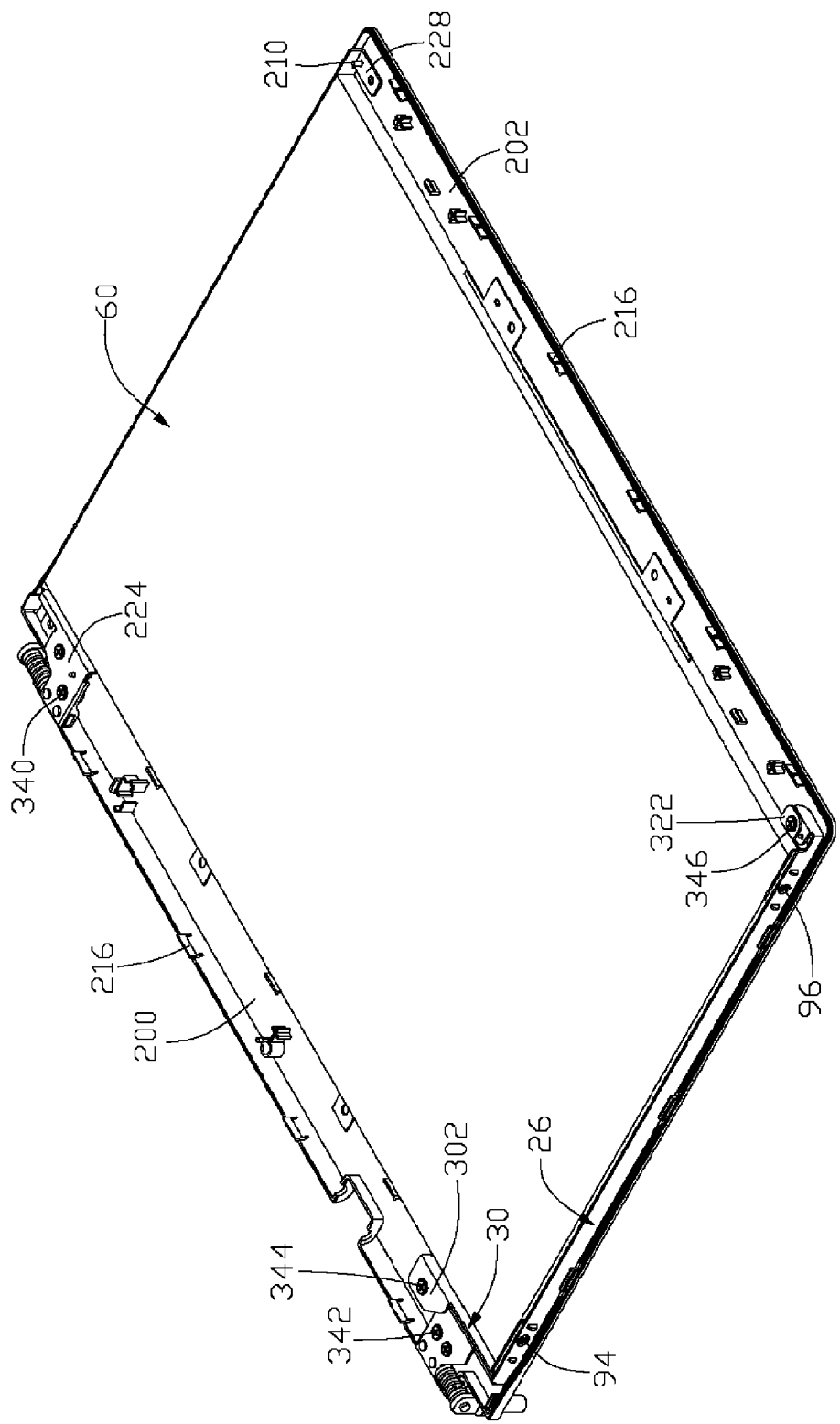
FIG. 4 is an assembled view of the mounting apparatus of FIG. 1, without the cover.
Figure 5:
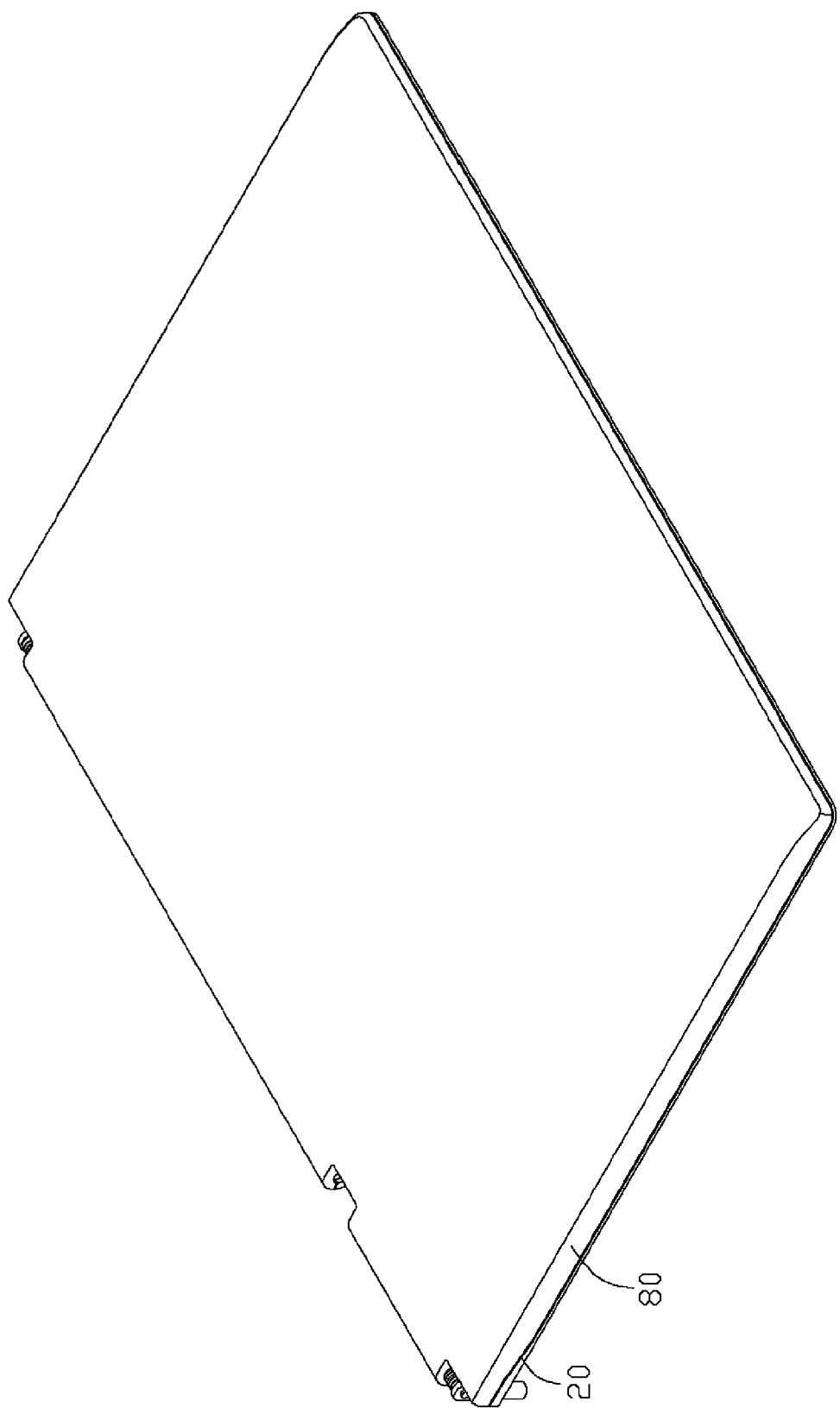
FIG. 5 is an assembled view of the mounting apparatus of FIG. 1, together with the LCD panel.

Referring also to FIGS. 4 and 5, in assembly, the guiding pin 210 of the bezel 20 engages in the guiding hole 230 of the first fixing bracket 22, and a pair of screws 340 is inserted through the fixing holes 226 of the first fixing bracket 22 to engage in the screw holes of the corresponding fixing posts 204. Thus, the first fixing bracket 22 is mounted to the bezel 20. A pair of screws 342 is inserted through the fixing holes 268 of the second fixing bracket 26 to engage in the screw holes of the corresponding fixing posts 206, for mounting the second fixing bracket 26 to the bezel 20. The tabs 310 of the first sliding member 30 slidably engage in the corresponding slots 264 of the second fixing bracket 26. The tabs 330 of the second sliding member 32 slidably engage in the corresponding slots 265 of the second fixing bracket 26. An adjustable receiving space is therefore formed between the bezel 20, the first fixing bracket 22 and the sliding members 30, 32. The LCD panel 60 is accommodated at the receiving space via adjusting the sliding members, 30, 32 to cause the receiving space having a suitable size for the LCD panel 60. Most of the LCD panel 60 is exposed in the opening 218 of the bezel 20. A pair of screws 92 is inserted through the apertures 222 of the first fixing bracket 22 to engage in the corresponding screw holes 61 of the LCD panel 60. The first sliding member 30 and the second sliding member 32 are respectively moved leftward or rightward via the tabs 310, 330 guided in the slots 264, 265 of the second fixing bracket 26 to abut against the LCD panel 60. A screw 94 is inserted through the through hole 262 of the second fixing bracket 26 and the aperture 308 of the first sliding member 30 to engage in the corresponding screw hole 61 of the LCD panel 60. A screw 96 is inserted through the through hole 263 of the second fixing bracket 26 and the aperture 328 of the second sliding member 32 to engage in the corresponding screw hole 61 of the LCD panel 60. The through holes 262, 263 are dimensioned to allow extension of heads of the screws 94, 96 therethrough. In this embodiment, the heads of the screws 94, 96 are partially accommodated in the through holes 262, 263 respectively. Then a screw 344 is inserted through the elongated slot 304 of the first sliding member 30 to engage in the screw hole of the holding post 208 of the bezel 20. A screw 346 is inserted through the elongated slot 324 of the second sliding member 32 and the locking hole 272 of the second fixing bracket 26 to engage in the screw hole of the holding post 212 of the bezel 20. The hooks 82 and the locking portions 84 of the cover 80 respectively engage with the locking portions 214 and the hooks 216 of the bezel 20, thereby mounting the cover 80 to the bezel 20.

The foregoing description of the exemplary embodiment of the invention has been presented only for the purposes of illustration and description and is not intended to be exhaustive or to limit the invention to the precise forms disclosed. Many modifications and variations are possible in light of the above teaching. The embodiment was chosen and described in order to explain the principles of the invention and its practical application so as to enable others skilled in the art to utilize the invention and various embodiments and with various modifications as are suited to the particular use contemplated. Alternative embodiments will become apparent to those skilled in the art to which the present invention pertains without departing from its spirit and scope. Accordingly, the scope of the present invention is defined by the appended claims rather than the foregoing description and the exemplary embodiment described therein.

What is claimed is:

1. A method for assembling a Liquid Crystal Display (LCD) device which comprising an LCD panel, a pair of fixing brackets, a sliding member, a bezel and a cover, comprising steps of:

securing the pair of fixing brackets to opposite sides of the bezel;

mounting the sliding member to one of the pair of fixing brackets with the sliding member slidable along a direction parallel to a display surface connected between sides of the LCD panel to form an adjustable receiving space between the sliding member and the other of the pair of fixing brackets;

placing the LCD panel to the receiving space via sliding the sliding member to cause the receiving space having a suitable size for the LCD panel;

securing the other of the pair of fixing brackets with one side of the LCD panel;

securing the sliding member with an opposite side of the LCD panel;

securing the sliding member to the bezel; and securing the cover and the bezel together such that the cover and the bezel sandwiches the LCD panel, the fixing brackets and the sliding member therebetween.

2. The method as claimed in claim 1, wherein one of the sliding member and said one of the fixing brackets defines a pair of slots, and the other of the sliding member and said one of the fixing brackets forms a pair of guiding protrusions slidably engaging in the slots respectively.

3. The method as claimed in claim 1, wherein the bezel defines a screw hole, and the sliding member defines an elongated slot extending in a direction perpendicular to the opposite side of the LCD panel, a fastener extending through the elongated slot to engage in the screw hole.

4. The method as claimed in claim 1, wherein the LCD device further comprises an additional sliding member which is slidably mounted to the one of the pair of fixing brackets before the LCD panel is place to the receiving space and is fixed to the one of the pair of fixing brackets and the bezel after being secured with the LCD panel.

\* \* \* \* \*